United States Patent [19]

Gausman et al.

[11] Patent Number: 4,790,348

[45] Date of Patent: Dec. 13, 1988

[54] LOW PRESSURE RELIEF VALVE

[75] Inventors: Theodore J. Gausman, Willoughby; Gary W. Scheffel, Streetsboro, both of Ohio

[73] Assignee: Nupro Company, Willoughby, Ohio

[21] Appl. No.: 89,430

[22] Filed: Aug. 26, 1987

[51] Int. Cl.$^4$ .............................................. F16K 17/06
[52] U.S. Cl. ...................... 137/516.29; 137/543.21; 137/540; 251/86; 251/360; 251/363
[58] Field of Search ...................... 137/516.25, 516.29, 137/540, 543.21; 251/84, 86, 360, 363

[56] References Cited

U.S. PATENT DOCUMENTS

| | | | |
|---|---|---|---|
| 3,362,680 | 1/1968 | Weiss | 251/360 |
| 4,335,744 | 6/1982 | Bey | 251/86 X |
| 4,530,373 | 7/1985 | Bork, Jr. et al. | 137/540 X |
| 4,637,430 | 1/1987 | Scheffel et al. | 137/543.21 |

Primary Examiner—John Rivell
Attorney, Agent, or Firm—Fay, Sharpe, Beall, Fagan, Minnich & McKee

[57] ABSTRACT

A relief valve for low pressure operation includes a valve body having an enlarged cylindrical bore in alignment with an inlet port and defining a valve chamber. An outlet opens laterally from the valve chamber at a location spaced from the inlet port. An insert member is received in the bore and defines an axially facing raised seat circumferentially about the inlet port at a location closely adjacent the outlet port. A poppet valve with a truncated conical configuration and a maximum outer diameter only slightly less than the inner diameter of the enlarged bore is mounted for engaging the seat and blocking flow through the inlet. A biased stem extends into the valve chamber in axial alignment with the seat insert. The stem has a cylindrical end portion which is received in a cylindrical opening formed axially into the poppet valve on the end thereof opposite the seat insert. The cylindrical end portion and the cylindrical opening are sized to permit lateral shifting and alignment of the poppet valve relative to the seat while preventing excessive and unwanted tilting of the poppet valve relative to the bore.

5 Claims, 1 Drawing Sheet

LOW PRESSURE RELIEF VALVE

BACKGROUND OF THE INVENTION

The subject invention is directed toward the valve art and, more particularly, to an improved pressure relief valve.

The invention is particularly suited for embodiment in an adjustable low pressure relief valve and will be described with special reference thereto; however, the invention is capable of broader application and could be incorporated in a variety of types and styles of check valves and pressure relief valves.

In commonly assigned U.S. Pat. No. 4,530,373 to Carl Bork et al. there is disclosed a pressure relief valve design which is particularly adapted for use in high pressure applications. Although the design can be used in low pressure applications, it incorporates a relatively small diameter valve element. In low pressure applications this small diameter results in a comparatively small area against which the upstream pressure can act for generating the opening force. As a consequence, the opening force is relatively small. With small forces available for opening the valve, it is difficult to assure that the valve will open consistently at the desired pressure setting. That is small changes in spring force, friction, valve sticking, etc. will produce significant changes in the pressure at which opening takes place.

It has, accordingly, been considered desirable to provide a pressure relief valve design which assures consistent operation throughout a wide range of low pressure settings.

BRIEF SUMMARY OF THE INVENTION

The subject invention assures the desired consistency in operation by providing a valve element and seat design which are related to the inlet and outlet ports in a manner that greatly increases the force available for valve operation. Moreover, the design allows the same basic valve body and adjustment mechanism to be used for both the prior design and the improved low pressure design.

In accordance with the subject invention, a valve of the type described includes a valve body having an inlet port and an enlarged cylindrical bore in alignment with the inlet port and defining a valve chamber. An outlet port opens laterally from the valve chamber at a location spaced from the inlet port. Received in the bore is an insert member which defines an axially facing raised seat circumferentially about the inlet port at a location closely adjacent the outlet port. A poppet valve is mounted in the chamber for controlling flow through the inlet. The poppet valve has a truncated conical configuration with a maximum outer diameter only slightly less than the inner diameter of the enlarged bore and a first end face for engaging the seat and blocking flow through the inlet. A bonnet is received in the bore and carries a stem which extends into the valve chamber in axial alignment with the seat insert. The stem has a cylindrical end portion which is received in a cylindrical opening formed axially into the poppet valve on the end thereof opposite the seat insert. The cylindrical end portion and the cylindrical opening are sized to permit lateral shifting and alignment of the poppet valve relative to the seat while preventing excessive and unwanted tilting of the poppet valve relative to the bore.

Preferably, the maximum outer diameter of the poppet valve is located closely adjacent the first end face and is sized to provide guiding movement on the inner diameter of the enlarged bore.

The relationship described results in the poppet being guided from both the interior wall of the valve chamber and the exterior surface of the stem. In addition, the relationship between the stem and the opening in the poppet is such as to prevent tilting and binding of the poppet in the valve chamber.

As a consequence of the above, the poppet valve can have an effective area exposed to upstream fluid pressure which is substantially equal to the diameter of the valve chamber. This increases the effective area over which opening force is generated and is especially advantageous for low pressure operation. Moreover, because the valve seat is substantially at or closely adjacent the outlet, fluid flow from the inlet to the outlet does not have to pass about the periphery of the poppet valve. Rather, opening of the poppet allows flow to go lateral direction directly from the inlet to the outlet.

Accordingly, as can be appreciated from the foregoing, the principal object of the invention is the provision of a pressure relief valve which is especially suited for low pressure operation.

Another object is the provision of a valve of the type described wherein the effective area of the valve element is substantially equal to the cross-sectional area of the valve chamber.

Yet another object is the provision of a pressure relief valve wherein the valve element is mounted in a manner which permits it to shift laterally to achieve alignment with the seat while being limited against undesirable tilting.

A further object is the provision of a pressure relief valve wherein the valve element is carried and guided by a stem which is mounted for sliding movement in a bonnet member.

BRIEF DESCRIPTION OF THE DRAWINGS

The above and other objects and advantages will become apparent from the following description when read in conjunction with the accompanying drawings wherein.

DESCRIPTION OF THE PREFERRED EMBODIMENT

Figure 1:
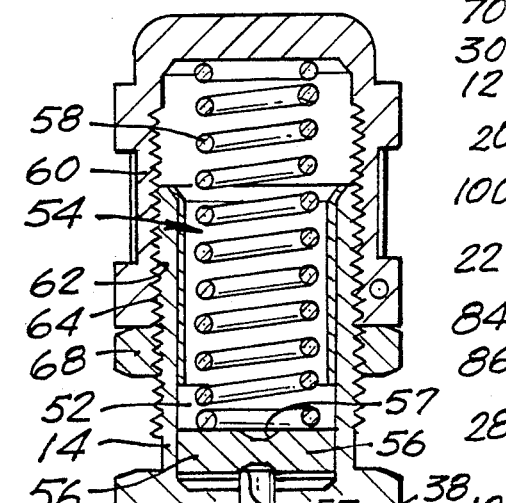
FIG. 1 is a cross-sectional elevational view of a pressure relief valve constructed in accordance with the present invention.

Referring more particularly to the drawings wherein the showings are for the purpose of illustrating a preferred embodiment of the invention only and not for the purpose of limiting same, FIG. 1 shows the overall arrangement of a pressure relief valve 10 including a valve body 12 and a cooperating bonnet 14. The valve body 12 is formed from any suitable material such as stainless steel and includes an axially extending inlet port 16 and a laterally extending outlet port 18. An enlarged, stepped diameter bore 20 extends axially inward from the upper end of body 12 and defines a valve chamber 22. In the embodiment shown, the body 12 is provided with pipe thread type fittings for permitting the valve to be connected to associated piping systems. Specifically, the inlet port 16 is provided with a male pipe thread connection 24 and the lateral outlet port 18 is provided with a female pipe thread connection 26. Other types of fittings could obviously be used.

Referring again to the bore 20 it will be noted that the bore has a stepped diameter with a reduced diameter innermost section 28 which is located beneath the lateral outlet 18. The bore 20 is axially aligned with the inlet port 16 and has its upper end closed by the bonnet 14. As shown, the lower end of bonnet 14 has suitable external threads 30 formed thereon to mate with threads 32 in the upper end of bore 20. At the outermost or upper end the bore 20 is provided with a conical chamfer 34 which cooperates with the exterior of the bonnet 14 to define a seal receiving cavity 36. In the embodiment shown, an O-ring 38 is received within the cavity 36 to provide a fluid tight seal about the upper end of the valve chamber 22. The central section 40 of the bonnet 14 is radially enlarged and acts to compress the O-ring 38 in the cavity 36. Preferably, the external radial surface of the enlarged portion 40 is provided with a hexagonal or other polygonal external shape for engagement with a wrench or the like for installation and removal of the bonnet 14.

Slidably carried within the bonnet 14 is a poppet valve guide stem member 44. As shown, the stem 44 is slidably received within a stepped diameter axial bore 46. The stem 44 is of a corresponding stepped diameter with a relatively large diameter lower end portion and a smaller diameter upper end portion. The lower end of the stem 44 extends into the valve chamber 22 and receives the poppet valve element 50 in a manner subsequently to be described. The upper free end of the stem 44 extends into an axially extending chamber 52 formed inwardly from the upper end of the bonnet 14.

The stem 44 is maintained under a continual downward bias by an adjustable compression spring assembly 54 carried in the bore 52. The adjustable spring assembly 54 includes a circular support disc 56 which is closely received in the bore 52 and bears against the upper end of the reduced diameter end portion of stem 44. The support disc 56 includes a conical recess 57 located centrally in the end face thereof and receiving a rounded end on the reduced diameter portion of stem 44. In the embodiment shown, the disc 56 has a conical recess formed in each side thereof so that the disc can be assembled into the bore 52 in either direction. Carried or bearing against the upper face of disc 56 is the compression spring 58 which is maintained under an adjustable compression force by a cap member 60. The cap member 60 is internally threaded as shown at 62 and engages with external thread 64 formed on the outer end of the bonnet 14. Axial adjustment of the cap 60 varies the compressive force applied through spring 58 to the stem 44 and, in turn, the poppet valve 50. Preferably, a lock nut 68 is received on the external threads 64 to engage with the undersurface of cap 60 to lock the cap in its axially adjusted position.

Formed about the lower end of stem 44 and extending into the bonnet 14 is a counterbore 70. A seal ring in the form of a quad-ring 72 is positioned in the counterbore 70 in surrounding and sealing relationship with the lower end of stem 44. The quad-ring 72 is maintained properly compressed within the recess 70 by a push-in retainer ring 74 received within a second relatively shallow counterbore 76.

The valve thus far disclosed and described is substantially as shown in the commonly assigned U.S. Pat. No. 4,530,373. The primary differences between the subject valve and that shown in the noted patent are to be found in the design and operational relationships within the valve chamber 22.

Figure 2:
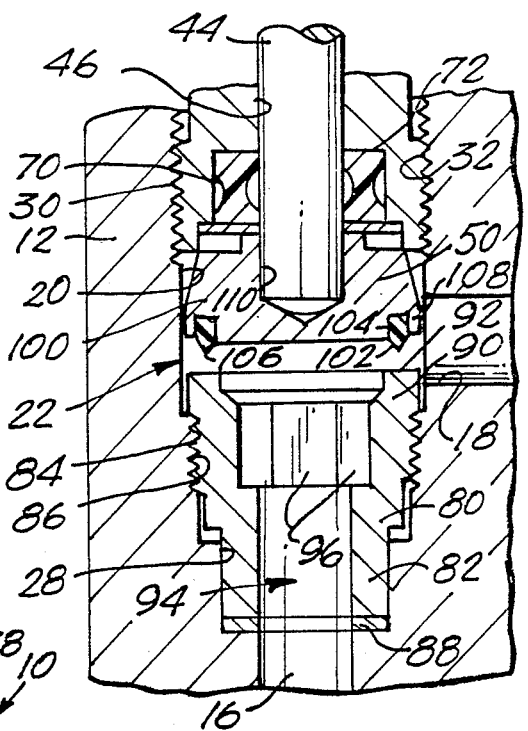
FIG. 2 is an enlarged view of the circled area of FIG. 1 but showing the valve in an open position.

Referring specifically to FIG. 2 it will be seen that a valve seat defining insert member 80 is threadably mounted in the lower end of the stepped diameter bore 20. The insert 80 has a reduced diameter end portion 82 which is closely received in the reduced diameter innermost section 28 of the bore 20. Threads 84 are formed about the exterior of the insert 80 for cooperation with threads 86 formed internally of the bore 20. A suitable seal member 88 is positioned at the lower end of the bore 20 for sealing engagement with the end face of insert 80.

At its upper end the insert 80 has a circumferentially extending end portion 90 which defines a raised, axially facing seat 92. It should be noted that the seat 92 is located substantially at the elevation of the lateral outlet 18. A suitable central passage 94 extends through the insert 80 connecting the seat area 92 with the inlet port 16. Within the passageway 94 there are provided cooperating wrench flats 96. Specifically, the interior of the passage 94 has a hexagonal cross-section so that it can receive a standard Allen wrench or the like. This allows the insert 80 to be readily installed and removed from the bore 20.

As discussed, the seat area 92 is located at an elevation substantially corresponding to the lateral outlet 18. In addition, the seat preferably is in a plane transverse to the axis of the bore 20. As shown, the seat 92 is closely adjacent the wall of the bore 20 so that the area enclosed by the seat is at a substantial maximum.

Cooperating with the seat to seal flow from the inlet 16 to the outlet 18 is the previously mentioned poppet valve member 50. Poppet member 50 comprises a relatively thick disc-like body 100. A seal member 102 is carried on the lower face of the body 100. Specifically, the seal 102 is bonded in an axially extending, circumferential groove 104 formed about the outer periphery of the lower face of body 100. Preferably, the seal 102 is shaped as shown in FIG. 2 and tapers to a relatively narrow sealing edge portion 106. The flange 108 about the exterior of the seal 102 has an axial length which is less than the center portion of the body 100. This provides space for the seal material to extrude or deform when the valve is subject an extremely high back pressure. In addition, under high back pressure conditions a metal-to-metal seal can occur between the body 100 and the area immediately about the inside of the seal 102 and the inner portion of the seat 92.

The poppet body 100 is slidably carried on the lower, large diameter end of the stem member 44. In this regard, the body 100 includes a bore 110 which is sized slightly larger than the exterior diameter of the stem 44. In addition, the bore 110 extends a significant distance axially into the body 100. The relative dimensions of the stem 44 and the opening 110 are such as to limit the tilting that the poppet can undergo relative to the stem while permitting some lateral shifting between the poppet and stem for assuring centering of the poppet within the bore 20. With respect to the guiding and shifting of the poppet 50 it should be noted that the poppet body 100 has a generally truncated conical configuration with its largest diameter located on a plane substantially corresponding to the plane of the seal 102. This diameter of the poppet body is only slightly smaller than the inner diameter of the bore 20. This allows the poppet to obtain guidance with the inner wall of the bore. In addition, the truncated conical shape allows the poppet to tilt slightly in the bore without binding against the walls of the bore.

It should be noted that (as shown in FIG. 1), when the poppet is in an open position it backseats against the lower end of the bonnet member 40. In addition, when in the open position flow from the inlet port 16 can take place directly to the outlet without flowing about the poppet element 50. The arrangement described allows the lower face of the poppet exposed to the upstream pressure to have a maximum effective area. This is achieved without significant modification of the valve body or bonnet assembly. Thus, one basic valve body and bonnet assembly can be used for both extremely high pressure operation and low pressure operation.

The invention has been described in great detail sufficient to enable one of ordinary skill in the art to make and use the same. Obviously, modifications and alterations of the preferred embodiment will occur to others upon a reading and understanding of the specification. Accordingly, it is our intention to include all such modifications and alterations as part of our invention insofar as they come within the scope of appended claims.

What is claimed is:

1. A pressure relief valve comprising:
   a valve body having an inlet port and an enlarged cylindrical bore extending axially into said body in alignment with said inlet port to define an enlarged valve chamber;
   an outlet port opening laterally from said valve chamber at a location spaced from said inlet port;
   a seat insert member threadedly received in said enlarged bore and sealed with said body to define an axially facing raised seat closely adjacent the wall of the bore and circumferentially about said inlet port at a location upstream of said outlet port at an elevation substantially corresponding to the elevation of said outlet port;
   a poppet valve mounted in said chamber, said poppet valve having a truncated conical configuration with a maximum outer diameter only slightly less than the inner diameter of said enlarged bore and a first end face for engaging said seat and blocking flow from said inlet to said outlet; said maximum outer diameter of said poppet valve being adjacent said first end face and sized to provide guiding movement on the inner diameter of said enlarged bore;
   a bonnet threadedly received in said enlarged bore at a location axially spaced from seat insert;
   a stem carried in said bonnet to extend into said enlarged valve chamber in axial alignment with said seat insert;
   said stem having a cylindrical end portion received in a cylindrical opening formed axially into said poppet member on the end thereof opposite said seat insert, said cylindrical end portion and said cylindrical opening being sized to permit lateral shifting and alignment of said poppet valve member relative to said seat while preventing excessive unwanted tilting of said poppet valve member relative to said bore such that said poppet is guided by the inner diameter of said enlarged bore and the outer diameter of said cylindrical end portion of said stem; and
   means for maintaining said stem member and said poppet valve member under a predetermined bias toward said seat.

2. A pressure relief valve as defined in claim 1 wherein said poppet valve member includes a resilient seal portion located circumferentially of said first end face at a radius to engage said raised seat.

3. A pressure relief valve as defined in claim 2 wherein said seat insert has a stepped outer diameter.

4. A pressure relief valve as defined in claim 2 wherein said stem extends a substantial distance into said poppet valve member.

5. A pressure relief valve as defined in claim 1 wherein said seat insert includes tool receiving surfaces formed centrally thereof for permitting installation and removal of said seat insert.

* * * * *